United States Patent [19]
Egendorf

[11] Patent Number: 4,475,222
[45] Date of Patent: Oct. 2, 1984

[54] TAPE CASSETTE WITH USE COUNTER
[76] Inventor: Harris H. Egendorf, 340 Red Lion Rd., Apt. E, Philadelphia, Pa. 19154
[21] Appl. No.: 332,783
[22] Filed: Dec. 21, 1981
[51] Int. Cl.³ .................. G11B 23/04; G11B 19/06
[52] U.S. Cl. .................................. 377/15; 360/93; 377/28
[58] Field of Search ............. 360/93, 137; 377/3, 377/15, 16, 28

[56] References Cited
U.S. PATENT DOCUMENTS
3,601,557  8/1971  Lennox ........................ 360/137
3,604,624  9/1971  Miura et al. .................. 360/137
3,678,215  7/1972  Kihara .

Primary Examiner—John S. Heyman
Attorney, Agent, or Firm—Seidel, Gonda & Goldhammer

[57] ABSTRACT

The housing of a tape cassette is provided with mechanical or electrical structure for recording the number of times the cassette housing is withdrawn from a video cassette recorder. A display window on the cassette displays indicia representative of the number of removals of the cassette from such recorder whereby a rental fee may be charged based on said indicia.

11 Claims, 10 Drawing Figures

TAPE CASSETTE WITH USE COUNTER

BACKGROUND

Video cassette recorders have spawned a new industry with respect to rental of tapes on movies. I perceive a need for a simple, inexpensive and reliable recorder on the tape cassette for recording the number of uses by the person renting the cassette.

U.S. Pat. No. 3,678,215 discloses a cassette designed to facilitate rentals based on frequency of use. The cassette disclosed in said patent suffers from a number of drawbacks. The cassette disclosed in said patent is not a standard cassette and requires an opening in an end wall. The cassette includes a counter at an end of the cassette opposite from said end wall with plural levers which pivot about mutually perpendicular axes, elongated rods, etc. for actuation by a specially designed member on the recorder chassis. Hence, the chassis will not be a standard chassis. Triggering the cassetter requires the cassette to be placed on a chassis and then slid from left to right in order to trip the recorder.

The present invention is directed to a solution of the above problems of the prior art.

SUMMARY OF THE INVENTION

The present invention is directed to a tape cassette which in most respects is conventional. The conventional cassette includes upstanding walls defining unused space. The present invention includes means in such unused space and responsive to removal of the cassette from a recorder for recording the number of such removals. The cassette has a display window for displaying indicia representative of the number of such removals. Thus, a rental fee may be based on such indicia which is representative of frequency of use.

It is an object of the present invention to provide a tape cassette with a counter to facilitate rental fees based on frequency of use.

It is another object of the present invention to provide a tape cassette which in most respects is conventional while utilizing normally unused space to count the frequency of use of the cassette.

Other objects and advantages of the present invention will be set forth hereinafter.

For the purpose of illustrating the invention, there is provided in the drawings a form which is presently preferred; it being understood, however, that this invention is not limited to the precise arrangements and instrumentalities shown.

DETAILED DESCRIPTION

Figure 1:
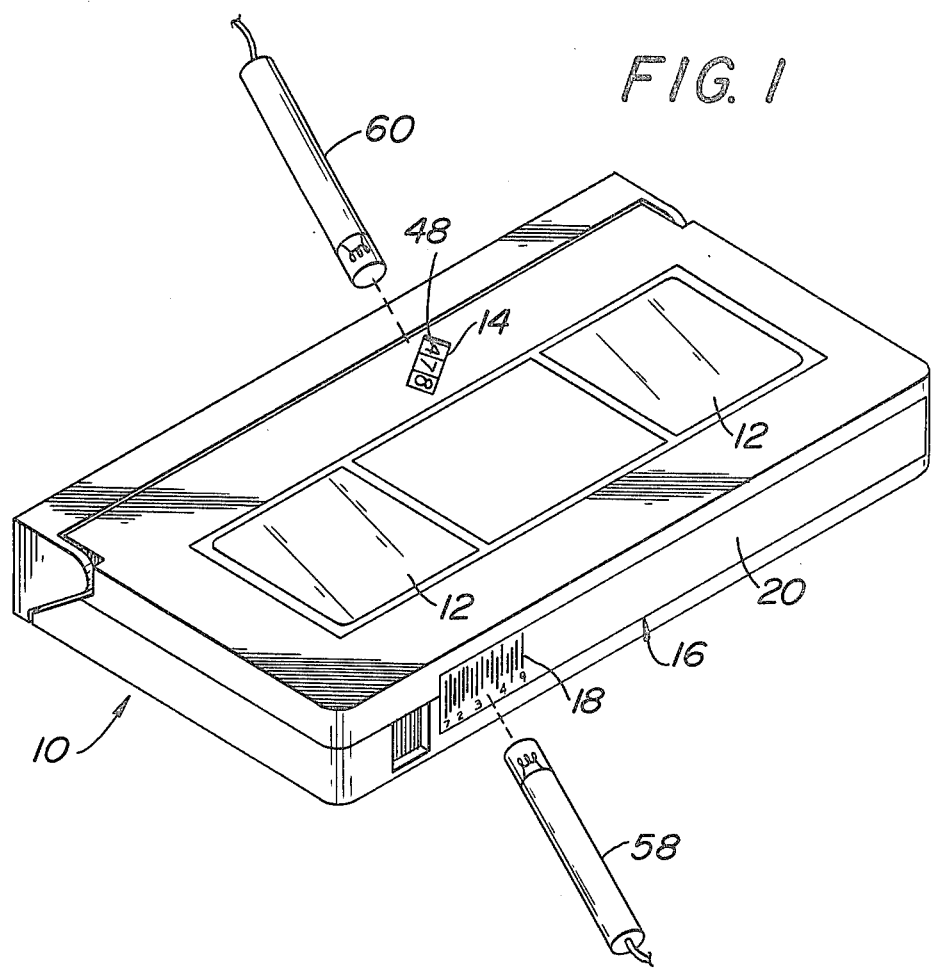
FIG. 1 is a perspective view of a cassette in accordance with the present invention.

Referring to the drawings in detail, wherein like numerals indicate like elements, there is shown in FIG. 1 a VHS cassette 10 having upper and lower housing halfs snapped together in a conventional manner. The housing halfs are preferably made from molded plastic with a pair of transparent windows 12 in a top half of the housing. The top half of the housing is modified to include a window 14 for purposes to be described hereinafter.

At the parting line of the halfs of the housing, there is attached a label 16. Label 16 includes machine readable indicia 18 identifying a particular store, the title of a tape, the copy number of the tape, and the date that the tape was put into service. The label 16 also includes a space 20 for receiving a printed title of the tape. The lable 16 preferably extends around a corner and may include a warning notice that any attempt to open the housing will result in tearing of the label which will constitute evidence that the cassette has been tampered with.

Figure 2:
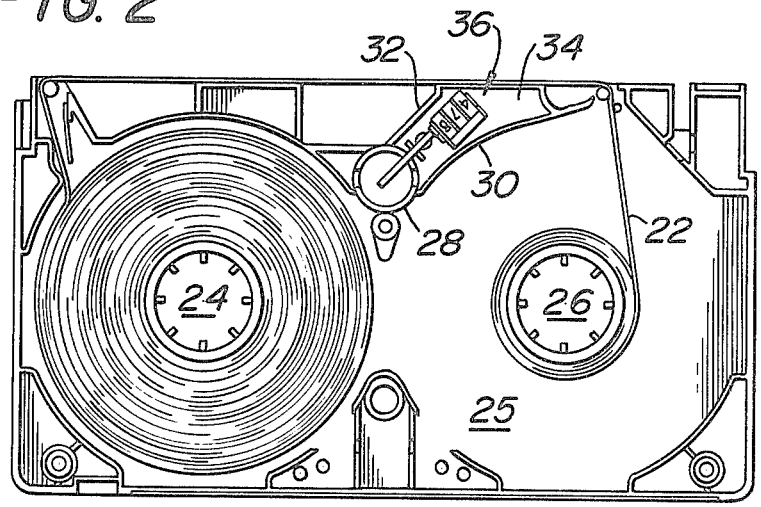
FIG. 2 is a top plan view of the cassette with the cover removed.

Referring to FIG. 2, there is shown a plan view of the bottom half of the housing in the cassette 10. A tape 22 is wound around sprockets 24 and 26 which are rotatably supported by the bottom wall 25. Upstanding walls 30 and 32 extend toward a side wall from a cylindrical light shaft 28. The light shaft 28 cooperates with walls 30 and 32 to define an unused space 34. Within such space 34 there is provided a use counting device 36 in accordance with the present invention. Except for the provision of device 36 and window 14, the cassette housing half as shown in FIG. 2 is conventional. Thus, the present invention seeks to utilize previously unused space in a conventional cassette to incorporate the use counting device whereby the present mold for making a standard cassette need not be substantially modified. The only modification to such standard mold is to incorporate means for providing the window 14 in the top half of the housing of the cassette 10.

Figure 3:
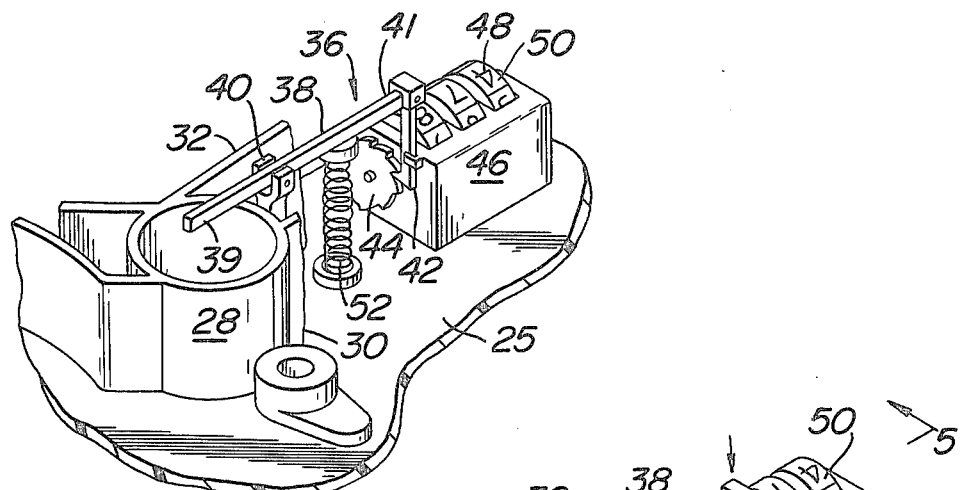
FIG. 3 is a partial perspective view showing one position of the counting mechanism on an enlarged scale.
Figure 4:
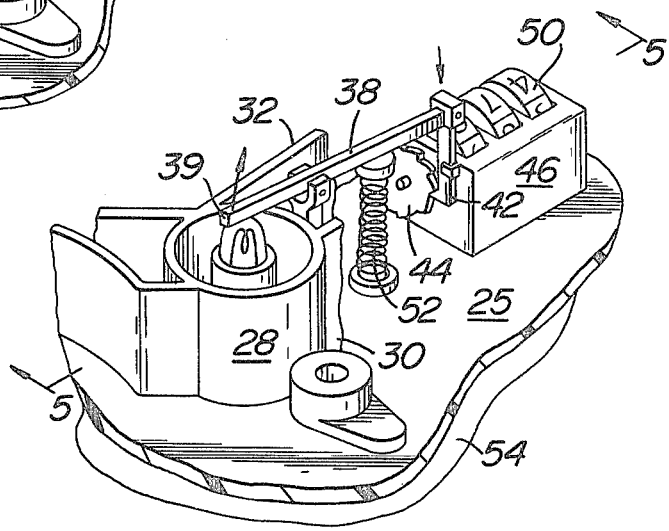
FIG. 4 is a view similar to FIG. 3 but showing another position of the mechanism.
Figure 5:
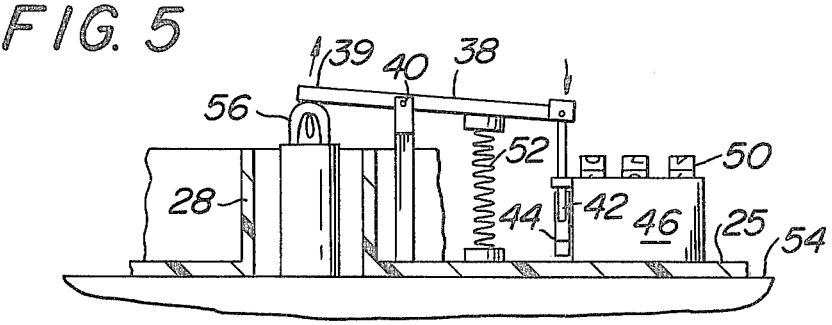
FIG. 5 is a sectional view taken along the line 5—5 in FIG. 4.
Figure 6:
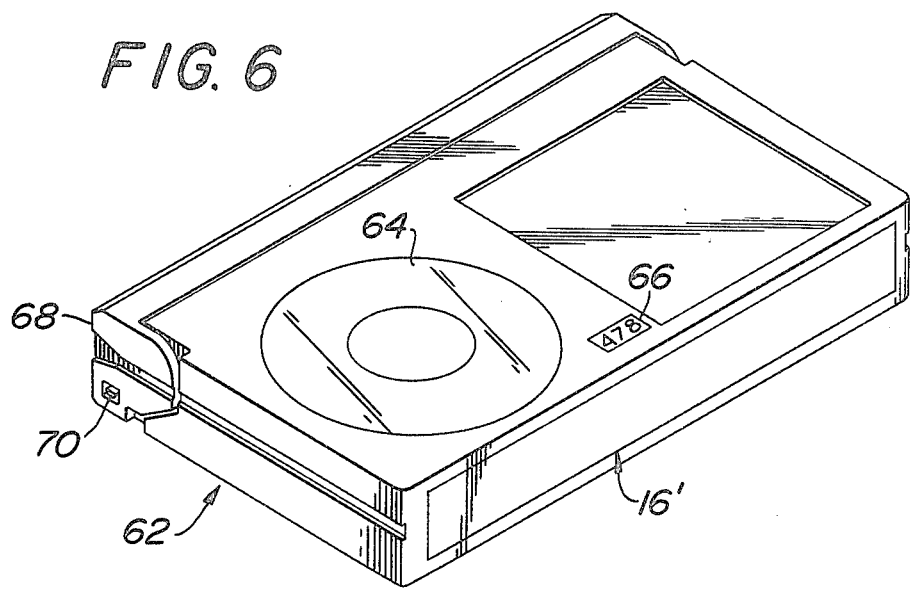
FIG. 6 is a perspective view of another embodiment of the present invention.

Referring to FIGS. 3—5, the device 36 is shown on an enlarged scale. Device 36 includes a trip lever 38 having one end portion designated 39 and the other end portion designated 41. The lever 38 intermediate its ends is pivoted at 40. A pawl 42 is pivotably connected to lever end portion 41 and engages a tooth on a cog 44. Cog 44 is part of the counter 46. Counter 46 has wheels 50 provided with indicia 48 on their outer periphery. The wheels 50 are prevented from indexing due to vibration, shock when the cassette is dropped, etc. Counter 46 is preferably a conventional counter. Lever 38 is biased to the horizontally disposed shown in FIG. 3 by spring 52. While spring 52 is a coil spring, any conventional type of spring may be utilized.

When the cassette 10 is placed into a video cassette recorder 54, a light source 56 on the recorder 54 projects upwardly through the light shaft 28. Either the bulb of the light source 56 or a supporting structure therefore will contact the end portion 39 of lever 38 and pivot the same in a clockwise direction as shown in FIGS. 4 and 5 thereby compressing spring 52 while moving pawl 42 downwardly to engage the next tooth on the cog 44. The components illustrated and described herein remain in the position as shown in FIGS. 4 and 5 during playing of the tape 22.

The cassette of the present invention is utilized as follows. When a cassette is rented to a customer, a laser recording pen 58 records the information on the label 16. Another laser recording pen 60 records the indicia 48. The information recorded is fed to a computer for purposes of inventory. The components in the cassette 10 when rented will be in the disposition shown in FIGS. 2 and 3. When the cassette 10 is introduced into the video cassette recorder 54, the light source 56 will project through the light shaft 28 to facilitate illumination of the interior of the cassette 10. At the same time, the light source 56 will move the lever 38 from the position shown in FIG. 3 to the position shown in FIGS. 4 and 5. The components remain in that position during use of the cassette 10 so long as the cassette 10 remains within the recorder 54.

When the cassette 10 is removed from the recorder 54, spring 52 expands and pawl 42 indexes the cog 44 one digit. When the cassette 10 is returned by the customer, laser pen 58 will record the indicia 18 and laser pen 60 will record the indicia 48 which will now read 479 thereby indicating that the customer pays a rental fee for one use. If the indicia 48 read 480, the customer would pay a rental fee based on two uses. If the label 16 has been destroyed or torn, the customer would also pay a fine as set forth in the rental agreement.

Thus, it will be seen that no changes are required in connection with the recorder 54 in order to use the cassette of the present invention. The only change in the cassette 10 is the addition of the window 14 and the provision of the device 36 which is located in normally unused space 34.

The above described embodiment of the present invention is particularly adapted for use with cassettes of the VHS type. Another type of cassette which is commercially available is the cassette designated generally as 62. Cassette 62 as shown in FIGS. 6–10 is of the beta format. Cassette 62 has a label 16' which may be identical to label 16 and contains the same information. Cassette 62 has only one transparent window 64. A window 66 is provided on the cassette 62 for performing the same function as window 14. A door 68 is pivoted along one side of the cassette 62 opposite from the side bearing the label 16'. A latch 70 holds the door 68 closed. Latch 70 is biased to a latching position by a spring biased lever 72 within the cassette as shown more clearly in FIG. 7.

Figure 7:
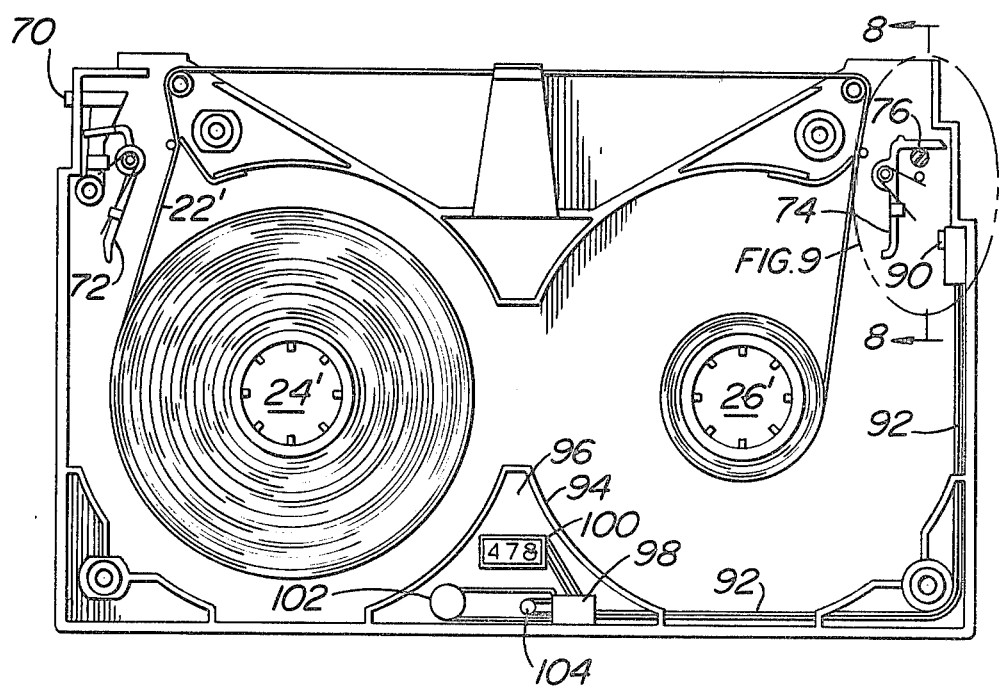
FIG. 7 is a plan view showing the cassette of FIG. 6 but with the cover removed.
Figure 8:
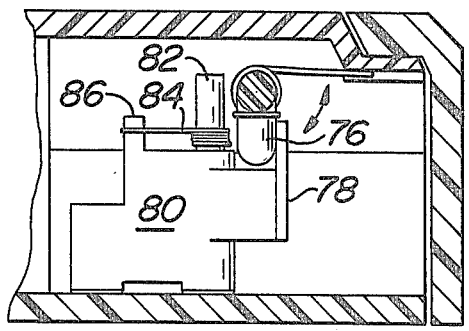
FIG. 8 is a sectional view taken along the line 8—8 in FIG. 7 but on an enlarged scale.
Figure 9:
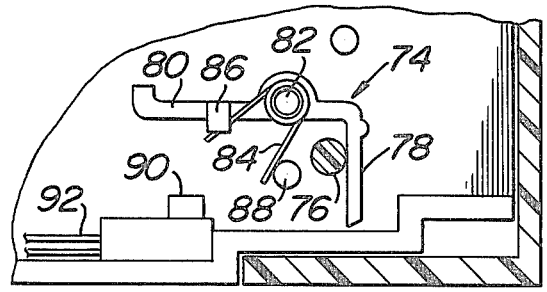
FIG. 9 is a partial plan view as indicated in FIG. 7 but on an enlarged scale.

Referring to FIGS. 7 and 9, at the opposite end of the door 68, remote from the latch 70, the bottom half of the cassette housing includes a L-shaped lever 74 having legs 78 and 80. A pin 76 attached to the door 68 contacts leg 78. Lever 74 is spring biased to the position shown in FIGS. 7 and 9. Lever 74 is mounted on post 82. Spring 84 is a torsion spring having one leg in contact with an upstanding lug 86 on leg 80. The other leg of spring 84 is in contact with a upstanding post 88 attached to the bottom wall of the cassette housing.

In normally unused space within the cassette housing, there is provided a microswitch 90. Microswitch 90 is connected by conductors 92 to other components within normally unused space 96 defined by the upstanding wall 94. Within space 96 there is provided a counter 98 which preferably is an electronic circuit in the form of a computer chip which adds digits to the LED display 100. Microswitch 90 may be normally open or closed and counter 98 is appropriately designed to read either the leading or trailing edge of the electrical pulse. The counter 98 is powered by a battery 102 coupled thereto across microswitch 90. Counter 98 may be provided with an adjustment switch 104 for adjusting digits on the display 100. The indicia of display 100 is visible through the window 66.

Figure 10:
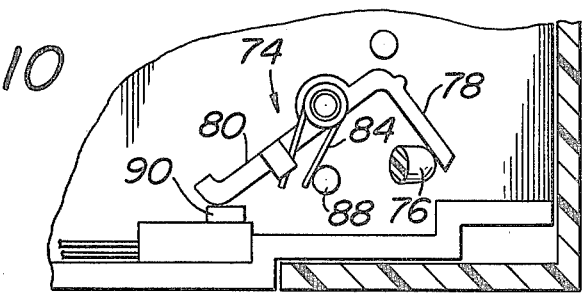
FIG. 10 is a view similar to FIG. 9 but showing the lever being tripped when inserted into a recorder.

When the cassette 62 is introduced into a recorder of the beta format type, latch 70 will be automatically released by the recorder and door 68 will be pivoted to an open position. When the door 68 is pivoted to an open position, the lever 74 is moved from the position shown in FIG. 9 to the position shown in FIG. 10. When the lever 74 is in the position shown in FIG. 10, its leg 80 contacts the microswitch 90 and spring 84 is compressed. During playing of the tape 22', the components remain in the position as shown in FIG. 10. When the cassette 62 is withdrawn from the recorder, door 68 is pivoted to a closed position thereby permitting the spring 84 to expand. When spring 84 expands, it interrupts the contact with microswitch 90. Such interruption causes the counter 98 to add one digit to the indicia exhibited on the display 100 through the window 66.

Thus, it will be noted that each embodiment of the present invention adds a digit to a recorder upon withdrawl of the cassette from the recorder with the turning function being performed mechanically in connection with cassette 10 and electrically in connection with cassette 62. At the same time, each embodiment utilizes normally unused space within the cassette whereby the only change to the cassette is the provision of the window 14 or 66 insofar as manufacture of the cassette housing is concerned. The cassettes 10 and 62 are processed in the same manner as described above with respect to inventory control, the manner in which fees are charged on the basis of frequency of use, etc.

The present invention may be embodied in other specific forms without departing from the spirit or essential attributes thereof and, accordingly, reference should be made to the appended claims, rather than to the foregoing specification, as indicating the scope of the invention.

I claim:

1. A tape cassette for use with a video cassette recorder which does not require the cassette to be shifted sideways relative to the recorder comprising a housing for video tape extending between reels, an upstanding internal wall adjacent a peripheral wall of said housing, means on said housing responsive to removal of the housing from a video cassette recorder including means for counting and displaying the number of such removals, said counting means including a display window on the cassette for displaying indicia representative of the number of such removals, said counting means being located at least in part in a dead space between said walls.

2. A cassette in accordance with claim 1 including a label applied to a side wall of said housing, said label having machine readable indicia in the form of a bar code identifying said video tape.

3. A cassette in accordance with claim 1 wherein said means includes a spring biased lever operatively associated with a counter within said housing.

4. A cassette in accordance with claim 3 wherein said spring biased lever is operatively associated with a door on said cassette.

5. A cassette in accordance with claim 3 wherein said spring biased lever overlies a light shaft on said housing.

6. A cassette in accordance with claim 1 wherein said means includes an electrical circuit having an electronic chip responsive to operation of a microswitch which is tripped upon each such removal.

7. A cassette in accordance with claim 1 wherein said means includes a mechanical counter tripped by a lever upon each such withdrawl.

8. A cassette in accordance with claim 1 wherein said housing is comprised of mating halves, and a tampering indicator label overlying the joint between said halves on an end or a side wall of said housing, said label having machine readable indicia.

9. A tape cassette for use with a video cassette recorder comprising a housing for video tape, means on said housing responsive to removal of the housing from a video cassette recorder including means for counting the number of such removals, said housing having mating halves, a tampering indicator label overlying the joint between said halves on a peripheral wall of said housing, said label having machine readable indicia, said counting means being located at least in part in a dead space between an internal wall and an adjacent portion of said peripheral wall of said housing.

10. A VHS tape cassette for use with a video cassette recorder comprising a housing having a video tape wound around spaced sprockets, said housing having a light shaft for receiving illumination means on a video cassette recorder, a counter in said housing, said housing having a window for displaying indicia associated with said counter, an actuator for said counter associated with said light shaft and adapted to contact illumination means projecting through the light shaft for indexing said counter one digit.

11. A tape cassette of the beta format type comprising a housing having a pivotable door along one side thereof, tape in said housing and wound around sprockets, a movable member within said housing and responsive to opening and closing of said door, an electrical circuit in said housing including an electronic counter and microswitch, said microswitch being positioned for contact with said member in one position thereof for causing said counter to index one digit on indicia of a display controlled by said counter, said housing having a window through which such display is visible.

* * * * *